(12) United States Patent
Drumm

(10) Patent No.: US 9,003,903 B2
(45) Date of Patent: Apr. 14, 2015

(54) LINEAR UNIT

(75) Inventor: Stefan A. Drumm, Saulheim (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 163 days.

(21) Appl. No.: 13/393,332

(22) PCT Filed: Aug. 31, 2010

(86) PCT No.: PCT/EP2010/062672
§ 371 (c)(1),
(2), (4) Date: Feb. 29, 2012

(87) PCT Pub. No.: WO2011/026826
PCT Pub. Date: Mar. 10, 2011

(65) Prior Publication Data
US 2012/0160043 A1    Jun. 28, 2012

(30) Foreign Application Priority Data

Sep. 1, 2009   (DE) .......................... 10 2009 029 075
Aug. 30, 2010  (DE) .......................... 10 2010 039 916

(51) Int. Cl.
*F16H 25/20*   (2006.01)
*H02K 7/06*    (2006.01)
*B60T 13/74*   (2006.01)
*F16H 25/22*   (2006.01)

(52) U.S. Cl.
CPC ........... *F16H 25/20* (2013.01); *Y10T 74/18576* (2013.01); *F16H 25/2021* (2013.01); *B60T 13/745* (2013.01); *F16H 25/2204* (2013.01); *F16H 2025/204* (2013.01); *F16H 2025/2075* (2013.01); *H02K 7/06* (2013.01)

(58) Field of Classification Search
CPC .......................... F16H 25/20; F16H 25/2021
USPC .......... 74/89.23, 89.33, 89.34; 188/72.7, 72.8
See application file for complete search history.

(56) References Cited

U.S. PATENT DOCUMENTS

| 3,682,283 | A | * | 8/1972  | Sato ............................. 192/141 |
| 4,865,162 | A |   | 9/1989  | Morris et al. |
| 5,348,123 | A | * | 9/1994  | Takahashi et al. ........... 188/72.1 |
| 6,315,086 | B1| * | 11/2001 | Schmitt et al. ............... 188/72.7 |
| 6,603,228 | B1| * | 8/2003  | Sato ............................... 310/83 |

(Continued)

FOREIGN PATENT DOCUMENTS

| DE | 42 29 042 A1  | 3/1993 |
| DE | 197 40 867 A1 | 3/1999 |

(Continued)

OTHER PUBLICATIONS

International Search Report—PCT/EP2010/062672—Oct. 22, 2010.

*Primary Examiner* — William C Joyce
(74) *Attorney, Agent, or Firm* — Brinks Gilson & Lione

(57) ABSTRACT

A linear unit for applying an axially acting force, composed of a rotational/translational gear (2) which has a threaded spindle (18) and a threaded nut (19) which are arranged in a gear housing (22), and of an electric motor (1) with a rotor (12) and with a stator (11) which are arranged in an electric motor housing (10). In order to simplify the set-up of the linear unit, while at the same time reducing the packaging space required, according to the invention the threaded spindle (18) is mounted rotatably and axially fixedly inside the gear housing (22) and is connected to the rotor (12) outside the gear housing (22).

13 Claims, 1 Drawing Sheet

(56) References Cited

U.S. PATENT DOCUMENTS

| | | | |
|---|---|---|---|
| 6,767,305 B2* | 7/2004 | Backes et al. | 475/149 |
| 6,938,735 B1* | 9/2005 | Hilzinger | 188/72.1 |
| 8,212,181 B2* | 7/2012 | Matsumoto et al. | 219/136 |
| 2003/0178264 A1* | 9/2003 | Halasy-Wimmer et al. | 188/158 |
| 2006/0266146 A1 | 11/2006 | Waide | |
| 2009/0243600 A1* | 10/2009 | Itomi | 324/207.25 |

FOREIGN PATENT DOCUMENTS

| | | |
|---|---|---|
| DE | 103 06 430 A1 | 11/2003 |
| GB | WO 89/03782 | 5/1989 |

\* cited by examiner

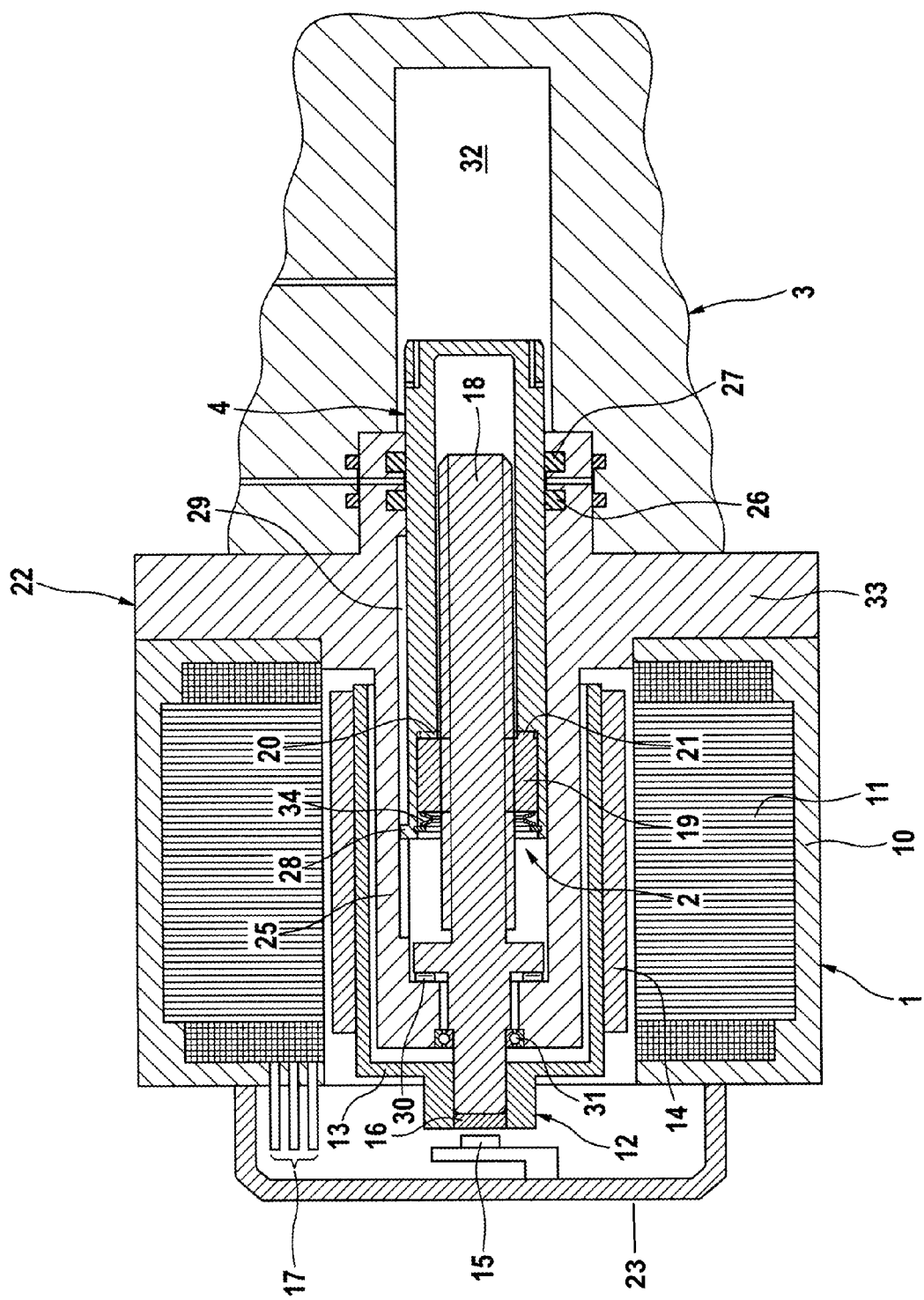

LINEAR UNIT

CROSS-REFERENCE TO RELATED APPLICATIONS

This application claims priority to German Patent Application Nos. 10 2009 029 075.3, filed Sep. 1, 2009; 10 2010 039 916.7, filed Aug. 30, 2010, and PCT/EP2010/062672, filed Aug. 31, 2010.

FIELD OF THE INVENTION

The invention relates to a linear unit for applying an axially acting force which may be implemented as part of a motor vehicle brake system. The linear unit is composed of a rotational/translational gear, which has a threaded spindle and a threaded nut, and of an electric motor with a rotor and with a stator which are arranged in a housing.

BACKGROUND OF THE INVENTION

A linear unit of the above-referenced type is known from WO 89/03782 A1. In the previously known linear unit, the rotational/translational gear is formed by what is known as a ball screw, the threaded nut of which is connected directly to the rotor of the electric motor, while the threaded spindle transmits its translational movement by means of one end, designed as a push rod, to a master cylinder arrangement following the linear unit. Securing the threaded spindle against rotation, as is necessary for this purpose, is implemented in that the other end of the threaded spindle has a flattened form and is received by a correspondingly shaped perforation of the electric motor housing. The prior art unit is felt to have the disadvantages of a complicated set-up entailing high manufacturing costs and, in particular, the considerable axial overall length.

The object of the present invention, therefore, is to improve a linear unit of the abovementioned generic type to the effect that its set-up is simplified, while at the same time the packaging space required is reduced.

This object is achieved, according to the invention, by means of the features of the present invention.

BRIEF DESCRIPTION OF THE DRAWINGS

The invention is explained in more detail below by means of an exemplary embodiment in relation to the accompanying drawing, the single FIG. 1 of the drawing showing a linear unit according to the invention, illustrated in longitudinal section, in an assembled and partially actuated state.

DETAILED DESCRIPTION OF THE INVENTION

As may be gathered from the drawing, the linear unit according to the invention is composed essentially of two premountable subassemblies, specifically of an electric motor 1 and of a further subassembly with a gear housing 22 which receives a rotational/translational gear 2 and also a force transmission member or piston 4. In the exemplary embodiment shown, the rotational/translational gear 2 is designed as a simple movement thread. To produce a functional unit, the subassemblies are plugged one into the other and are connected to one another by being fixed nonpositively by means of connection elements, not illustrated. In a further development, the actuator according to the invention is designed as a hydraulic actuator in that the force transmission member 4 is sealed off with respect to the gear housing 22 and functions as a piston rod. To build up a hydraulic pressure, the force transmission member 4 designed as a piston rod penetrates into a fluid-filled bore 32.

The electric motor 1 has an electric motor housing 10 in which are arranged a stator 11 and a rotor 12 which form the torque-generating parts of the electric motor 1. The rotor 12 is composed of a pot-shaped sleeve 13, on the surface of which permanent magnet segments 14 are arranged at regular angular intervals. To determine the angular position of the rotor 12 or sleeve 13 required for an in-phase application of current to the stator 11, a contactlessly operating position sensor 15 is provided, which, in the version illustrated, cooperates with a magnet 16 arranged in the rotor 12 or sleeve 13 and the signals of which are fed to an electronic control or regulation unit, not illustrated. Electrical contact elements 17 formed on the winding overhang and protected from damage, for example by means of a cover 23, serve for connecting the stator winding to a suitable electrical current source (not illustrated).

The abovementioned rotational/translational gear 2 serves for converting the rotational movement driven by the rotor 12 of the electric motor 1 into a translational movement of the force transmission member 4. For this purpose, the rotational/translational gear 2 has a gear housing 22, a threaded spindle 18 and a threaded nut 19 which is in engagement with the threaded spindle 18 and which is arranged nonrotatably in the force transmission member 4. In this case, the threaded nut 19 is in engagement with the force transmission member 4 by means of intermeshing crown (or "castle") teeth 20 and 21 which is formed in each case on the threaded nut 19 and on the force transmission member 4, respectively. The constant engagement of the teeth 20 and 21 is ensured by a spring element which acts in the axial direction and which is supported axially on the piston 4 and is designed in the example shown as a cup spring assembly 34. Instead of the simple movement thread illustrated, which forms the rotational/translational gear 2, any other rotational/translational gear, such as, for example, a ball screw or a roller screw, may, of course, also be used.

As may be gathered from the drawing, furthermore, the sleeve 13 forming the rotor 12 surrounds radially a portion 25 of pot-shaped design of the gear housing 22. On the one hand, the housing 3 which may be part of a motor vehicle braking system master cylinder and, on the other hand, the housing 10 of the electric motor 1 are supported axially on a radial flange 33 of the gear housing 22. The portion 25 receives the rotational/translational gear 2 and the force transmission member or piston 4 and has two immovably arranged sealing elements 26 and 27 at its end facing the housing 3 and piston 4, the pot-shaped portion 25 forming a guide of the force transmission member or piston 4 in the radial direction. The force transmission member 4 has, at its end facing away from the master cylinder housing 3, a plurality of radial projections, one of which is illustrated and is given the reference symbol 28. The projections 28 form, together with longitudinal slots 29 made in the pot-shaped portion 25, a device for securing the piston 4 against rotation in the pot-shaped portion 25.

Finally, it is clear from the drawing that the threaded spindle 18 is supported on an axial bearing 30 arranged in the pot-shaped portion 25, while that end of the threaded spindle 18 which faces the housing 3 and piston 4 arrangement is guided in a radial bearing 31 provided in the pot-shaped portion 25 and is in torque-transmitting connection to the rotor 12 or sleeve 13.

The functioning of the linear unit constructed according to the invention, arises, in principle, from the disclosure content of the present application for the person skilled in the relevant technical art. When the arrangement shown is actuated or when current is applied to the electric motor 1, the pot-shaped rotor 12 or sleeve 13 is set in rotational movement which is transmitted to the threaded spindle 18. As a result of the rotational movement of the threaded spindle 18, a displacement movement of the threaded nut 19 to the right in the drawing takes place, during which the force transmission element or piston 4 is likewise displaced to the right, with the result that, in a pressure space 32 delimited by the piston 4 in the housing 3, a hydraulic pressure is built up which is transferred via a pressure connection to a hydraulic circuit, not shown, for example a hydraulic brake system of a motor vehicle.

The invention claimed is:

1. A linear unit for applying an axially acting force, comprising a rotational/translational gear which has a threaded spindle and a threaded nut which are arranged in a gear housing, an electric motor with a rotor and a stator which are arranged in an electric motor housing, the threaded spindle is mounted rotatably and axially fixedly inside the gear housing and is connected to the rotor outside the gear housing; and an axially moveable force transmission member surrounded by the gear housing;
   wherein the threaded nut and the force transmission member are separate parts, and the threaded nut is secured against rotation to the force transmission member and the force transmission member is secured against rotation by the gear housing;
   wherein the threaded spindle directly contacts the rotor;
   wherein the rotor of the electric motor is in the form of a hollow shaft, and the gear housing has a portion of pot-shaped design which is surrounded by the rotor;
   wherein the portion of pot-shaped design of the gear housing surrounds the force transmission member, the threaded nut and the threaded spindle;
   wherein the force transmission member is guided axially movably and secured against rotation in the portion of pot-shaped design of the gear housing, wherein the force transmission member is secured against rotation by the portion of pot-shaped design; and
   wherein an axial bearing, on which the threaded spindle is supported, is arranged on the bottom of the pot-shaped portion.

2. The linear unit as claimed in claim 1, wherein the threaded nut is supported in the direction of actuation on the force transmission member via an axial contact force, and rotation of the threaded nut in relation to the force transmission member being blocked.

3. The linear unit as claimed in claim 1, wherein the force transmission member is in the form of a hydraulic piston rod which is sealed off with respect to the gear housing.

4. The linear unit as claimed in claim 1, wherein the securing against rotation is formed by one or more radial projections formed on the force transmission member and by longitudinal slots which are formed in the inner wall of the pot-shaped portion and into which the one or more projections engage.

5. The linear unit as claimed in claim 1, wherein a radial bearing in which one end of the force transmission member is mounted is arranged in the pot-shaped component.

6. The linear unit as claimed in claim 1 further comprising a device for detecting the rotor position of the electric motor.

7. The linear unit as claimed in claim 6, wherein the device for detecting the rotor position is in the form of a contactlessly operating sensor arrangement having a position transmitter arranged on the longitudinal axis of the linear unit and a fixed position sensor element.

8. The linear unit of claim 1, wherein the gear housing directly contacts the force transmission member to secure the force transmission member against rotation.

9. The linear unit of claim 1, wherein a portion of the threaded spindle that contacts the rotor extends axially beyond an end of the gear housing.

10. A linear unit for applying an axially acting force, comprising a rotational/translational gear which has a threaded spindle and a threaded nut which are arranged in a gear housing, an electric motor with a rotor and a stator which are arranged in an electric motor housing, the threaded spindle is mounted rotatably and axially fixedly inside the gear housing and is connected to the rotor outside the gear housing;
    wherein the rotor of the electric motor is in the form of a hollow shaft, and the gear housing has a portion of pot-shaped form which is surrounded by the rotor;
    wherein the portion of pot-shaped design of the gear housing surrounds a force transmission member, the threaded nut and the threaded spindle;
    wherein the force transmission member is guided axially movably and secured against rotation in the portion of pot-shaped design of the gear housing;
    wherein the threaded nut is supported in the direction of actuation on the force transmission member via an axial contact force, and rotation of the threaded nut in relation to the force transmission member being blocked; and
    wherein the blocking of the rotation of the threaded nut in relation to the force transmission member takes place by means of intermeshing crown teeth formed by the threaded nut and the force transmission member.

11. The linear unit as claimed in claim 10 wherein an axially Acting spring element which urges the intermeshing crown teeth in engagement is Provided between the threaded nut and the force transmission member.

12. A linear unit for applying an axially acting force, comprising a rotational/translational gear which has a threaded spindle and a threaded nut which are arranged in a gear housing, an electric motor with a rotor and a stator which are arranged in an electric motor housing, the threaded spindle is mounted rotatably and axially fixedly inside the gear housing and is connected to the rotor outside the gear housing;
    wherein the rotor of the electric motor is in the form of a hollow shaft, and the gear housing has a portion of pot-shaped form which is surrounded by the rotor;
    wherein the portion of pot-shaped design of the gear housing surrounds a force transmission member, the threaded nut and the threaded spindle;
    wherein the force transmission member is guided axially movably and secured against rotation in the portion of pot-shaped design of the gear housing;
    wherein the threaded nut is supported in the direction of actuation on the force transmission member via an axial contact force, and rotation of the threaded nut in relation to the force transmission member being blocked; and
    wherein the blocking of the rotation of the threaded nut in relation to the force transmission member is cancelled when an axial tractive force occurs between the threaded nut and the force transmission member.

13. The linear unit as claimed in claim 12, wherein when the linear unit moves back into a neutral position, an axial stop of the force transmission member in the gear housing generates the axial tractive force between the threaded nut and force transmission member, the axial tractive force leading to a separation of the threaded nut and the force transmission member.

* * * * *

UNITED STATES PATENT AND TRADEMARK OFFICE
CERTIFICATE OF CORRECTION

PATENT NO.        : 9,003,903 B2  
APPLICATION NO.   : 13/393332  
DATED             : April 14, 2015  
INVENTOR(S)       : Stefan A. Drumm Page 1 of 1

It is certified that error appears in the above-identified patent and that said Letters Patent is hereby corrected as shown below:

<u>In the Claims</u>

In claim 11, column 4, line 32, delete "Acting" and insert --acting--.

In claim 11, column 4, line 33, delete "Provided" and insert --provided--.

Signed and Sealed this
First Day of September, 2015

Michelle K. Lee
*Director of the United States Patent and Trademark Office*